May 17, 1955
H. K. LINKS
FUEL-INJECTING APPARATUS FOR AN INTERNAL COMBUSTION ENGINE
Filed Sept. 20, 1952
2,708,601
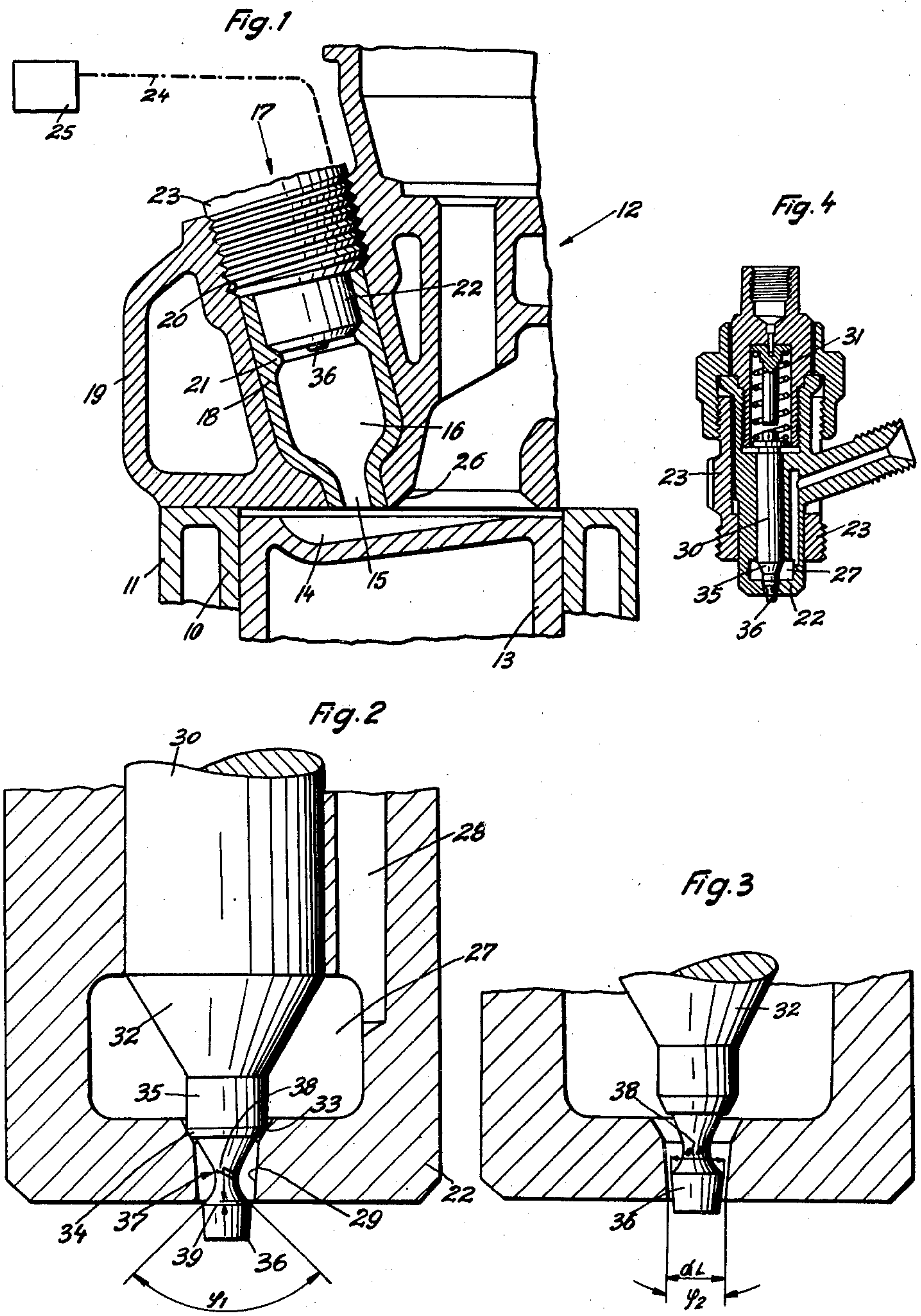
Inventor.
Heinrich K. Links
By Dicke and Padlon
Attorneys United States Patent Office 2,708,601

Patented May 17, 1955

2,708,601

FUEL-INJECTING APPARATUS FOR AN INTERNAL COMBUSTION ENGINE

Heinrich K. Links, Stuttgart, Germany, assignor to Daimler-Benz Aktiengesellschaft, Stuttgart-Unterturkheim, Germany Application September 20, 1952, Serial No. 310,635

Claims priority, application Germany September 27, 1951

3 Claims. (Cl. 299—107.6)

The present invention relates to a fuel-injecting apparatus for an internal combustion engine and to a method of operating a diesel engine. More particularly, the invention relates to an apparatus and to a method of the character indicated in which means are provided for varying the angular space over which the injected fuel is spread, such variation serving the purpose of eliminating or reducing knocking of the machine produced by a delay of the ignition and by a consequent abrupt explosion of the injected fuel.

It is the object of the present invention to provide a method of operating a diesel engine by intermittently injecting controlled quantities of fuel into the combustion spaces of the engine in which the injection angle over which the fuel is spread is varied in dependence on the conditions of operation of the engine so as to reduce or entirely eliminate the knocking noise incidental to the idling of the engine without impairing the efficiency of the engine when operated under full load conditions.

It is a further object of the present invention to provide simple and inexpensive means for controlling the injection angle in the manner indicated.

The invention is based on the discovery that the undesirable knocking noise incidental to the idling operation of a diesel engine may be reduced to a minimum by spreading the injected fuel over a large angle, and that a high efficiency of a diesel engine running under load requires that the fuel be injected in form of a more or less narrow jet distributing the fuel over a small injection angle. According to a preferred feature of the present invention, the novel method of operating the diesel engine by intermittently injecting controlled quantities of fuel into the combustion spaces of the engine controlling such quantities so as to meet the power requirements is characterized by the step of varying the injection angle coincidentally with a variation of said controlled quantities but in the opposite sense, i. e. increasing the injection angle when the controlled quantities are decreased and vice versa. Thus, when the engine is idling, the fuel is atomized within a wide spread conical space, whereas when the engine is running under load, a more or less narrow jet of fuel is injected into any combustion space.

Further objects of the present invention will appear from a preferred embodiment thereof described hereinafter with reference to the accompanying drawings. It is to be clearly understood, however, that such detailed description serves the purpose of explanation rather than of limitation of the invention.

In the drawings in which an example of the present invention is illustrated,

Fig. 1 is an axial section through one cylinder and cylinder head of a diesel engine equipped with the novel fuel-injecting apparatus of the present invention, the apparatus itself being shown in elevation;

Fig. 2 is an axial section through the lower portion of the novel fuel-injecting apparatus, the upper part thereof being shown broken away, the valve member being seated;

Fig. 3 is a view similar to that of Fig. 2, the valve member being shown in lifted condition, Figs. 2 and 3 showing the apparatus on an enlarged scale; and Fig. 4 is an axial section through the entire fuel-injecting apparatus shown on a reduced scale.

In Fig. 1 a well known diesel engine of the type having a pre-combustion chamber is shown by way of an axial section, the upper part of the cylinder 10 equipped with the cooling jacket 11 carrying a cylinder head generally designated by 12. A reciprocatory piston 13 operating a crankshaft (not shown) in the conventional manner has a dished end wall providing for a main combustion chamber 14 which communicates with the neck portion 15 of a pre-combustion chamber 16 into which the fuel is injected by a fuel-injecting apparatus generally designated by 17. The pre-combustion chamber 16 is formed by a hollow lining 18 which is inserted in a suitable passageway of the cylinder head 12, the latter being provided with a cooling jacket 19 in the conventional manner. More particularly, the upper portion of the passageway has internal threads and is confined by a shoulder 20 which lies substantially flush with the upper end of the lining 18. The latter has an internal flange 21. The injecting apparatus 17 has a body comprising a cylindrical lower portion 22 and a co-axial upper portion 23 integral therewith. The portion 23 has external threads adapted to engage the internal threads of the cylinder head and to be screwed down upon the shoulder 20. In that position the cylindrical portion 22 of the body engages the flange 21 whereby the lining 18 is firmly held in position.

The fuel-injecting apparatus 17 is connected by suitable means diagrammatically indicated by a dash-dotted line 24 to a fuel pump diagrammatically indicated by the rectangle 25 and suitably geared to the crankshaft of the engine to be driven thereby, such pump 25 being of the type adapted to feed controlled quantities of fuel under a high pressure, the control being effected by any suitable means, for instance by an accelerator pedal when the diesel engine is of the multi-cylinder type used in motor vehicles.

In operation the apparatus 17 intermittently injects into the pre-combustion chamber 16 the controlled quantities of fuel fed thereto by pump 25, the quantities of fuel being so controlled as to meet the power requirements. The injection takes place whenever the piston 13 approaching its upper position has compressed the air charge previously sucked into the cylinder. The fuel ignites within the highly heated air raising the pressure thereof and driving piston 13 downwardly. Suitable valves (not shown) control the admission of fresh air into the cylinder and the discharge of the exhaust gases therefrom. In the embodiment shown in Fig. 1 such valves are mounted in the cylinder head, a valve seat thereof being indicated at 26.

As shown in Figs. 2 and 3, the body portion 22 is provided with a cavity 27, with a conduit 28 communicating therewith, and with the pipe 24, and is further provided with a downwardly tapering nozzle 29 which communicates with the cavity 27 and is adapted to issue the fuel therefrom into the combustion space 16. A valve member 30 is slidably guided in the body 22, 23 and extends through the cavity 27 and is adapted to seal the communication thereof with the nozzle 29. Resilient means, e. g. in form of a spring 31, tends to keep the valve member 30 closed. The valve member, however, has a conical section 32 located within the cavity 27 and subjected to the pressure of the fuel fed thereto by pump 25 through pipe 24 and conduit 28. When the fuel is so fed the pressure thereof will act on the surface of the conical section 32 and will lift the valve member 30 contrary to the force exerted by spring 31. As a result, the fuel will flow through the slot confined by a conical valve seat 33 provided at the inner end of nozzle 29 and by a conical portion 34 adjoining a cylindrical lower projection 35 of the conical portion 32 of the valve member. Obviously, the stroke imparted to the valve member 30, 32, 34, 35 by the pressure of the fuel depends on the quantity of fuel fed by the pump 25 at any time, the valve member being lifted a slight distance only when such quantity of fuel is small and being lifted a larger distance when the quantity of fuel is large.

For the purpose of the present invention means are provided which will control the injection angle indicated at $\varphi_1$ and $\varphi_2$ in dependence on the quantity of the fuel injected or, in other words, on the distance by which the valve member is lifted. For that purpose, a fuel-guiding member 36 which, in the present embodiment, is of frusto-conical shape is rigidly connected with the valve member 30, 32, 35, 34 by a stem generally indicated by 37. The cone angle of member 36 may be slightly smaller than that of nozzle 29. Preferably, the lower end of the stem 37 adjoining the member 36 has the same diameter as the latter and tapers upwardly towards a central constriction 38 of the stem, the profile of the stem being rounded so as to provide for a smooth guiding surface for the fuel. The length of the stem is so chosen that when the valve member is seated, the portion 34 thereof bearing upon the seat 33, the upper edge 39 of the guiding member 36 is located closely in front of the mouth of the nozzle, the distance $h_1$ amounting to from 0.01 to 0.1 millimeter. The diameter $d_N$ of the fuel-guiding member is slightly smaller than the diameter $d_L$ of the lower mouth of nozzle 29. Preferably, the difference $d_L$ minus $d_N$ is two to four times the distance $h_1$. The taper of the lower end of stem 37 adjoining the fuel-guiding member 36 is indicated by the angle $\varphi_1$.

The operation of the novel fuel-injecting apparatus is as follows:

When the valve member 30, 32, 35, 34 is lifted by the controlled quantity of fuel fed into the cavity 27, it will permit the fuel while travelling through the first section of its stroke amounting to the distance $h_1$ to issue from between the narrow annular gap confined by the lower mouth of nozzle 29 and the upper edge 39 of the fuel-controlling member 36 in form of a thin conical spray having substantially the cone angle $\varphi_1$. The range of the globules of fuel issuing from the gap is comparatively small. Nevertheless the fuel will be distributed through a large area and mixed with a large volume of air for immediate combustion thus avoiding a delayed explosion causing the undesirable knocking noise.

After the valve member has travelled the distance $h_1$, the upper edge of the fuel control member 36 will enter the nozzle and approach the position shown in Fig. 3. Therefore, during this phase of the injection process the fuel will issue in form of a jet from between the annular gap confined on the outside by the conical wall of the nozzle and on the inside by the conical peripheral wall of the control member 36, the width of such gap amounting to $$\frac{d_L - d_N}{2}$$

The jet issued from the nozzle will have the injection angle shown in Fig. 3 at $\varphi_2$. The clearly defined upper edge of the fuel control member 36 offers the additional advantage that coked residues of fuel which may tend to stick to the control member 36 are torn off and carried away by the passing fuel injected into the combustion space. Therefore, the provision of the fuel control member 36 avoids the disadvantage frequently observed with prior art injecting apparatus of fuel residues accumulating on the faces of the valve needle tending to obstruct the nozzle more or less and to adversely affect the injection characteristics in a manner inconsistent with the geometrical dimensions of the nozzle valve. The conical shape of the nozzle 29 contributes to the tendency to remove any residues from the nozzle and from the fuel control member.

When the engine is idling, the quantity of fuel fed to the cavity 27 by the pump 25 is so small that the distance by which the valve member is lifted will not or not substantially exceed the distance $h_1$. Therefore, the fuel will be injected with the injection angle $\varphi_1$ in form of a conical veil of atomized fuel. As a result, immediate combustion devoid of the undesirable knocking phenomenon is ensured. When the engine is running under load, the pump 25 being controlled to inject larger quantities of fuel, the valve member will be lifted a distance exceeding $h_1$ and, consequently, most of the fuel will be injected in form of a narrow jet. The axial distance $h_1$ between the upper edge of the fuel control member 36 and the lower edge of the nozzle mouth is preferably so chosen that the amount of fuel required for an idling operation of the engine will lift the valve member a distance not exceeding $h_1$, same depending on the volume of the cylinder and amounting per average to from 0.01 to 0.1 millimeter.

The present invention results in a substantial improvement of the injection operation and will greatly reduce the noise produced by the engine. The reduction of noise may be explained by the fact that the shape of the injected spray of fuel and the timing of the fuel injection are particularly well suited to the conditions of operation. When the engine is idling, the concentration of the fuel globules is reduced by a wide distribution of the fuel, whereby a soft ignition devoid of an undesirable knocking noise is secured. On the other hand, when the engine is running under load, a narrow powerful jet of fuel is produced ensuring a high efficiency.

While the present invention has been described with reference to a preferred embodiment thereof, it is to be clearly understood that the same is not limited to the details thereof, but is capable of numerous modifications within the scope of the appended claims.

What I claim is:

1. Fuel injection apparatus for an internal combustion engine provided with a combustion space comprising a body provided with a cavity, a communicating conduit for connecting said cavity with a fuel pump, a nozzle communicating with said cavity for injecting the fuel from said cavity into said combustion space, said nozzle being formed conically in the direction of said combustion space, a valve member slidably guided in said body and extending through said cavity for sealing the communication thereof with said nozzle, resilient means for urging said valve member into closing position, said valve member having a section located within said cavity and subjected to the pressure of the fuel therein for opening said valve member by said pressure, a fuel-guiding member, a stem having a constricted portion intermediate both ends thereof rigidly connecting said fuel-guiding member to said valve member, the end of said stem adjacent said fuel guiding member sloping toward said constricted portion and having a diametric dimension substantially the same as the diametric dimension of said fuel-guiding member, said fuel-guiding member including a clearly defined upper edge located closely in front of the orifice of said nozzle with said valve member seated in said closing position, said fuel guiding member being of slightly smaller diameter than said orifice and conically formed similar to said nozzle and adapted to enter said nozzle upon lifting of said valve member from its seat under pressure by said fuel fed into said cavity in excess of the idling amount to provide an annular slot for issuing a narrow jet of fuel.

2. Fuel injection apparatus according to claim 1 wherein the conical angle of said fuel-guiding member is smaller than the conical angle of said nozzle.

3. Apparatus as claimed in claim 1 in which said fuel-guiding member is located a distance of from 0.01 to 0.1 millimeter spaced from the orifice of said nozzle in front thereof when said valve member is seated.

References Cited in the file of this patent

UNITED STATES PATENTS

| | | |
|---|---|---|
| 1,990,875 | Mock | Feb. 12, 1935 |
| 2,017,028 | Heinrich et al. | Oct. 8, 1935 |
| 2,183,284 | Wiebicke | Dec. 12, 1939 |
| 2,235,365 | Grumbt | Mar. 18, 1941 |

FOREIGN PATENTS

| | | |
|---|---|---|
| 532,013 | Germany | Aug. 22, 1931 |
| 886,596 | France | July 5, 1943 |